US012608309B2

(12) United States Patent (10) Patent No.: US 12,608,309 B2
Yu et al. (45) Date of Patent: Apr. 21, 2026

(54) DATA ACCESS METHOD, APPARATUS, AND SYSTEM

(71) Applicant: Huawei Technologies Co., Ltd., Shenzhen (CN)

(72) Inventors: Ankun Yu, Nanjing (CN); Bo Zhao, Shenzhen (CN); Qiqing Wu, Shenzhen (CN); Bingjian Hou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/825,043

(22) Filed: Sep. 5, 2024

(65) Prior Publication Data

US 2025/0077420 A1 Mar. 6, 2025

(30) Foreign Application Priority Data

Sep. 5, 2023 (CN) .......................... 202311140998.0

(51) Int. Cl.
*G06F 12/02* (2006.01)
*G06F 12/08* (2016.01)
(Continued)

(52) U.S. Cl.
CPC ...... *G06F 12/0246* (2013.01); *G06F 12/0868* (2013.01); *G06F 13/1668* (2013.01)

(58) Field of Classification Search
CPC ............. G06F 12/0246; G06F 12/0868; G06F 13/1668; G06F 12/0886; G06F 2212/1016;
(Continued)

(56) References Cited

U.S. PATENT DOCUMENTS 10,402,336 B2 9/2019 Akin et al.
11,392,500 B2 7/2022 Hughes
(Continued)

FOREIGN PATENT DOCUMENTS

CN 108595348 A 9/2018
EP 3230852 B1 12/2022

OTHER PUBLICATIONS

Seshadri, V., et al., "Gather-Scatter DRAM: In-DRAM Address Translation to Improve the Spatial Locality of Non-unit Strided Accesses," Proceedings of the 48th International Symposium on Microarchitecture, Oct. 27, 2015, 14 pages.
(Continued)

*Primary Examiner* — Masud K Khan
(74) *Attorney, Agent, or Firm* — Conley Rose, P.C.

(57) ABSTRACT

A data access method includes: receiving a data request, where the data request indicates a plurality of source storage addresses and a target data type; reading, from a memory based on the data request, a first memory block indicated by each of the plurality of source storage addresses, where a length of the first memory block is a granularity for accessing the memory; extracting data of each source storage address from the first memory block indicated by each source storage address; combining data of all the source storage addresses based on a length of a cache line to obtain a second memory block; and sending the second memory block to a processing subsystem, for the processing subsystem to cache the second memory block.

21 Claims, 8 Drawing Sheets

(51) Int. Cl.
   *G06F 12/0868*        (2016.01)
   *G06F 13/16*          (2006.01)
(58) Field of Classification Search
   CPC .. G06F 9/30047; G06F 9/3834; G06F 12/023;
   G06F 12/0811
   See application file for complete search history.

(56)                        References Cited

U.S. PATENT DOCUMENTS

| | | |
|---|---|---|
| 2018/0081557 A1 | 3/2018 | Kasibhatla et al. |
| 2018/0285280 A1 | 10/2018 | Akin et al. |
| 2019/0149486 A1 | 5/2019 | Bohrer et al. |
| 2019/0205244 A1* | 7/2019 | Smith .................... G06F 3/065 |
| 2020/0174929 A1 | 6/2020 | Heirman et al. |
| 2021/0089314 A1* | 3/2021 | Liu .................... G06F 12/0864 |
| 2023/0153116 A1 | 5/2023 | Nagarajan et al. |
| 2023/0214327 A1 | 7/2023 | Ma et al. |

OTHER PUBLICATIONS

Heirman, W., et al., "Automatic Sublining for Efficient Sparse Memory Accesses," ACM Transactions on Architecture and Code Optimization, vol. 18, No. 3, Article 33. Publication date: Apr. 2021, 23 pages.

\* cited by examiner

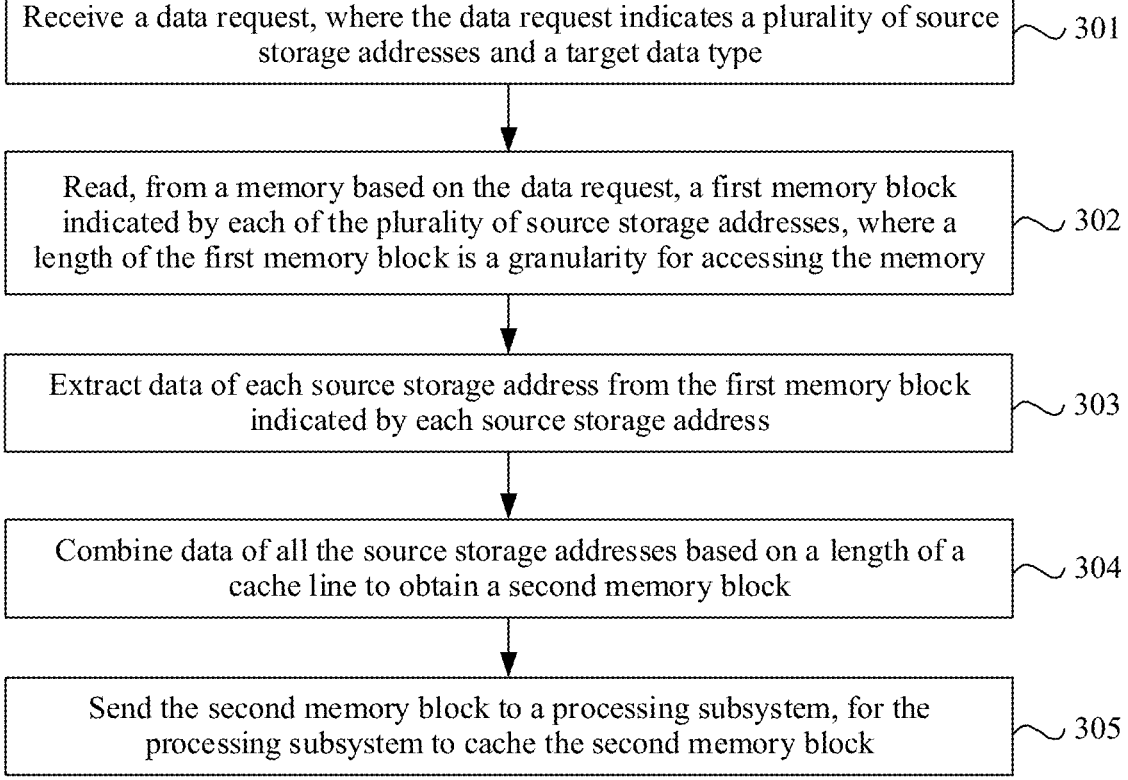

Receive a data request, where the data request indicates a plurality of source storage addresses and a target data type ~ 301

Read, from a memory based on the data request, a first memory block indicated by each of the plurality of source storage addresses, where a length of the first memory block is a granularity for accessing the memory ~ 302

Extract data of each source storage address from the first memory block indicated by each source storage address ~ 303

Combine data of all the source storage addresses based on a length of a cache line to obtain a second memory block ~ 304

Send the second memory block to a processing subsystem, for the processing subsystem to cache the second memory block ~ 305

FIG. 3

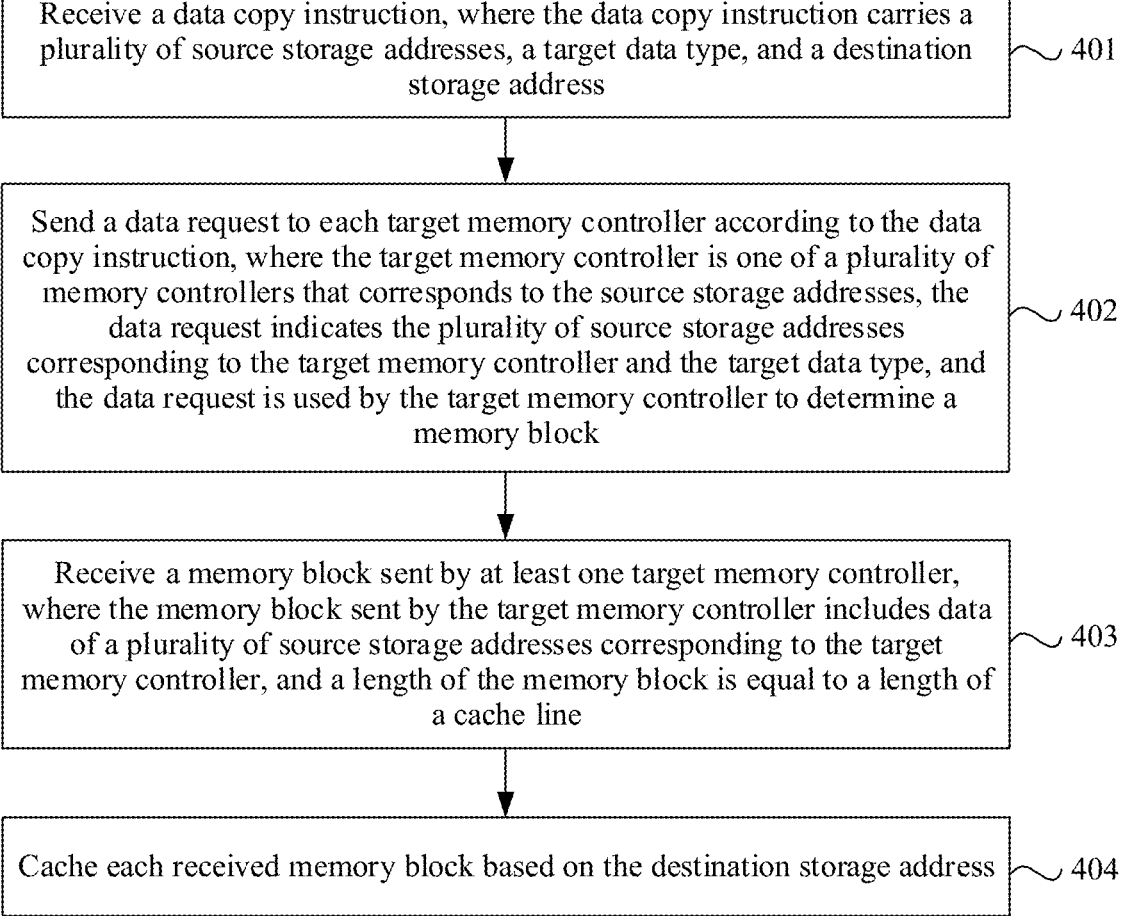

Receive a data copy instruction, where the data copy instruction carries a plurality of source storage addresses, a target data type, and a destination storage address ~ 401

Send a data request to each target memory controller according to the data copy instruction, where the target memory controller is one of a plurality of memory controllers that corresponds to the source storage addresses, the data request indicates the plurality of source storage addresses corresponding to the target memory controller and the target data type, and the data request is used by the target memory controller to determine a memory block ~ 402

Receive a memory block sent by at least one target memory controller, where the memory block sent by the target memory controller includes data of a plurality of source storage addresses corresponding to the target memory controller, and a length of the memory block is equal to a length of a cache line ~ 403

Cache each received memory block based on the destination storage address ~ 404

FIG. 4

DATA ACCESS METHOD, APPARATUS, AND SYSTEM

CROSS-REFERENCE TO RELATED APPLICATIONS

This claims priority to Chinese Patent App. No. 202311140998.0, filed on Sep. 5, 2023, which is incorporated by reference.

FIELD

This disclosure relates to the field of storage technologies, and in particular, to a data access method, apparatus, and system.

BACKGROUND

Sparse data access is widely used in high performance computing (HPC), big data, graph theory, and other fields. A processor accesses data from a memory to a cache per cache line. When reading data of a storage address, the processor reads an entire cache line corresponding to the storage address. A length of the cache line is usually 64 bytes. When data of a plurality of non-contiguous addresses or sparse addresses is accessed, only 4/8-byte data can be read in a cache line corresponding to each address. As a result, utilization of a 64-byte cache line and efficiency of loading data in the memory are lowered to 1/16 float (indicating a single-precision floating point) or 1/8 double (indicating a double-precision floating point). This wastes cache space and memory bandwidth.

In a related technology, a sub cache line technique is used for data access. In this technique, a sparse-data access buffer is introduced to detect whether sparse data is accessed for a plurality of times. When the sparse data is not accessed for a plurality of times, the data is accessed at a granularity of a length of the sub cache line rather than at a granularity of the length of the cache line. When the sparse data is accessed for the plurality of times, the data is accessed at a granularity of the length of the cache line as described in the foregoing access manner.

However, in the related technology, a new memory access channel and a new memory access protocol are needed for data access using the sub cache line. Therefore, an existing cache mechanism needs to be modified or a jump wire is needed, resulting in high chip manufacturing costs. In addition, during data access, the sparse-data access buffer first needs to determine an access channel. This increases complexity of a non-sparse data access process, and affects data loading performance in a data access scenario including sparse data access.

SUMMARY

This disclosure provides a data access method, apparatus, and system, to resolve a problem in a related technology that an existing cache mechanism needs to be modified or a jump wire is needed, and complexity of a non-sparse data access process is increased. This can reduce chip manufacturing costs, and data loading performance in a data access scenario including non-sparse-address access and noncontiguous-address access is not affected.

According to a first aspect, a data access method includes: receiving a data request, where the data request indicates a plurality of source storage addresses and a target data type; reading, from a memory based on the data request, a first memory block indicated by each of the plurality of source storage addresses, where a length of the first memory block is a granularity for accessing the memory; extracting data of each source storage address from the first memory block indicated by each source storage address; combining data of all the source storage addresses based on a length of a cache line to obtain a second memory block; and sending the second memory block to a processing subsystem, for the processing subsystem to cache the second memory block.

The source storage address is an address of a main memory, and the plurality of source storage addresses may be contiguous or non-contiguous.

Beneficial effect is that a plurality of pieces of valid data exist in one cache line length. This effectively improves utilization of a cache line and efficiency of loading data in a memory. In addition, the data of all the source storage addresses is combined based on the length of the cache line. Therefore, the second memory block may be sent to the processing subsystem according to an existing bus transmission protocol via a channel, a transmission protocol from a memory controller to the processing subsystem does not need to be modified, an existing cache mechanism does not need to be modified, and a jump wire is not needed. This reduces chip manufacturing costs. In addition, determining does not need to be performed before data of sparse addresses is accessed. Therefore, data loading performance in a data access scenario including non-sparse-address access and noncontiguous-address access is not affected.

In a possible implementation, the length of the first memory block is less than the length of the cache line.

Beneficial effect is that data whose length is less than the length of the cache line can be read based on each source storage address. This can improve effective memory bandwidth without modifying a cache mechanism.

According to a second aspect, a data access method includes: receiving a data copy instruction, where the data copy instruction carries a plurality of source storage addresses, a target data type, and a destination storage address; sending a data request to each target memory controller according to the data copy instruction, where the target memory controller is one of a plurality of memory controllers that corresponds to the source storage address, the data request indicates the plurality of source storage addresses corresponding to the target memory controller and the target data type, and the data request is used by the target memory controller to determine a memory block; receiving a memory block sent by at least one target memory controller, where the memory block sent by the target memory controller includes data of the plurality of source storage addresses corresponding to the target memory controller, and a length of the memory block is equal to a length of a cache line; and caching each received memory block based on the destination storage address.

For example, a length of the data of the plurality of source storage addresses is an integer multiple of the length of the cache line.

In a possible implementation, a process of caching each received memory block based on the destination storage address includes: when receiving memory blocks respectively sent by the plurality of target memory controllers, aggregating data in the received memory blocks into at least one target cache line; and caching the at least one target cache line based on the destination storage address.

According to a third aspect, a data access system includes a processing subsystem and a plurality of memory controllers. The processing subsystem is configured to receive a data copy instruction. The data copy instruction carries a plurality of source storage addresses, a target data type, and a destination storage address. The processing subsystem is further configured to send a data request to each target memory controller according to the data copy instruction. The target memory controller is one of the plurality of memory controllers that corresponds to the source storage address, and the data request indicates the plurality of source storage addresses corresponding to the target memory controller and the target data type. The target memory controller is configured to read, from a memory based on the data request, a first memory block indicated by each corresponding source storage address. A length of the first memory block is a granularity for accessing the memory. The target memory controller is further configured to extract data of each corresponding source storage address from each read first memory block, and combine data of all corresponding source storage addresses based on a length of a cache line to obtain a second memory block. The target memory controller is further configured to send the second memory block to the processing subsystem. The processing subsystem is further configured to cache each received second memory block based on the destination storage address.

In a possible implementation, the processing subsystem is further configured to: when receiving second memory blocks respectively sent by the plurality of target memory controllers, aggregate data in the received second memory blocks into at least one target cache line; and cache the at least one target cache line based on the destination storage address.

According to a fourth aspect, a data access apparatus includes: a transceiver module configured to receive a data request, where the data request indicates a plurality of source storage addresses and a target data type; and a processing module configured to read, from a memory based on the data request, a first memory block indicated by each of the plurality of source storage addresses, where a length of the first memory block is a granularity for accessing the memory. The processing module is further configured to extract data of each source storage address from the first memory block indicated by each source storage address. The processing module is further configured to combine data of all the source storage addresses based on a length of a cache line to obtain a second memory block. The transceiver module is further configured to send the second memory block to a processing subsystem, for the processing subsystem to cache the second memory block.

In a possible implementation, the length of the first memory block is less than the length of the cache line.

In a possible implementation, the plurality of source storage addresses are non-contiguous.

According to a fifth aspect, a data access apparatus includes: a transceiver module configured to receive a data copy instruction, where the data copy instruction carries a plurality of source storage addresses, a target data type, and a destination storage address, where the transceiver module is further configured to send a data request to each target memory controller according to the data copy instruction, the target memory controller is one of a plurality of memory controllers that corresponds to the source storage address, the data request indicates the plurality of source storage addresses corresponding to the target memory controller and the target data type, and the data request is used by the target memory controller to determine a memory block, and the transceiver module is further configured to receive a memory block sent by at least one target memory controller; and a processing module configured to cache each received memory block based on the destination storage address.

In a possible implementation, the processing module is further configured to: when receiving memory blocks respectively sent by the plurality of target memory controllers, aggregate data in the received memory blocks into at least one target cache line; and cache the at least one target cache line based on the destination storage address.

According to a sixth aspect, a data access apparatus includes one or more processors; and a memory configured to store one or more computer programs or instructions. When the one or more computer programs or instructions are executed by the one or more processors, the one or more processors are enabled to implement the method according to any implementation of the first aspect.

According to a seventh aspect, a data access apparatus includes one or more processors; and a memory configured to store one or more computer programs or instructions. When the one or more computer programs or instructions are executed by the one or more processors, the one or more processors are enabled to implement the method according to any implementation of the second aspect.

According to an eighth aspect, a data access apparatus includes a processor configured to perform the method according to any implementation of the first aspect.

According to a ninth aspect, a data access apparatus includes a processor configured to perform the method according to any implementation of the second aspect.

According to a tenth aspect, a data access apparatus includes a processing circuit and an interface circuit. The interface circuit is configured to: couple to an external memory of the data access apparatus, and provide a communication interface for the processing circuit to access the memory. The processing circuit is configured to execute program instructions in the memory, to implement the method according to any one of the first aspect and the second aspect.

In a specific implementation process, the data access apparatus may be a chip, an input circuit may be an input pin, an output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments.

In an implementation, the data access apparatus may be a wireless communication device, that is, a computer device supporting a wireless communication function. Specifically, the wireless communication device may be a terminal, for example, a smartphone, or may be a radio access network device, for example, a base station. A network chip may also be referred to as a system on chip (SoC), or referred to as a SoC chip for short. The communication chip may include a baseband processing chip and a radio frequency processing chip. The baseband processing chip is also sometimes referred to as a modem or a baseband chip. The radio frequency processing chip is also sometimes referred to as a radio frequency transceiver or a radio frequency chip. In a physical implementation, some or all chips of the communication chip may be integrated into the SoC chip. For example, the baseband processing chip is integrated into the SoC chip, but the radio frequency processing chip is not integrated into the SoC chip. The interface circuit may be a radio frequency processing chip in the wireless communication device, and the processing circuit may be a baseband processing chip in the wireless communication device.

In still another implementation, the data access apparatus may be some components in the wireless communication device, for example, an integrated circuit product such as a network chip or a communication chip. The interface circuit may be an input/output interface, an interface circuit, an output circuit, an input circuit, a pin, a related circuit, or the like on the chip or the chip system. The processor may alternatively be embodied as a processing circuit or a logic circuit.

According to an eleventh aspect, a computer-readable storage medium stores program code, and when the program code is executed by a processor, the method according to any one of the first aspect and the second aspect is implemented.

According to a twelfth aspect, a chip includes at least one processor. The at least one processor is configured to perform the method according to any one of the first aspect and the second aspect.

Optionally, the chip further includes a memory. The at least one processor is configured to execute code in the memory, and when the at least one processor executes the code, the chip is enabled to implement the method according to any one of the first aspect and the second aspect.

Optionally, the chip may be an integrated circuit.

According to a thirteenth aspect, a computer program product includes instructions. When the computer program product runs on a computer, the computer is enabled to perform the method according to any one of the first aspect and the second aspect.

BRIEF DESCRIPTION OF THE DRAWINGS

FIG. 3 is a schematic flowchart of a data access method according to an embodiment;

FIG. 4 is a schematic flowchart of another data access method according to an embodiment;

DETAILED DESCRIPTION

Figure 1:
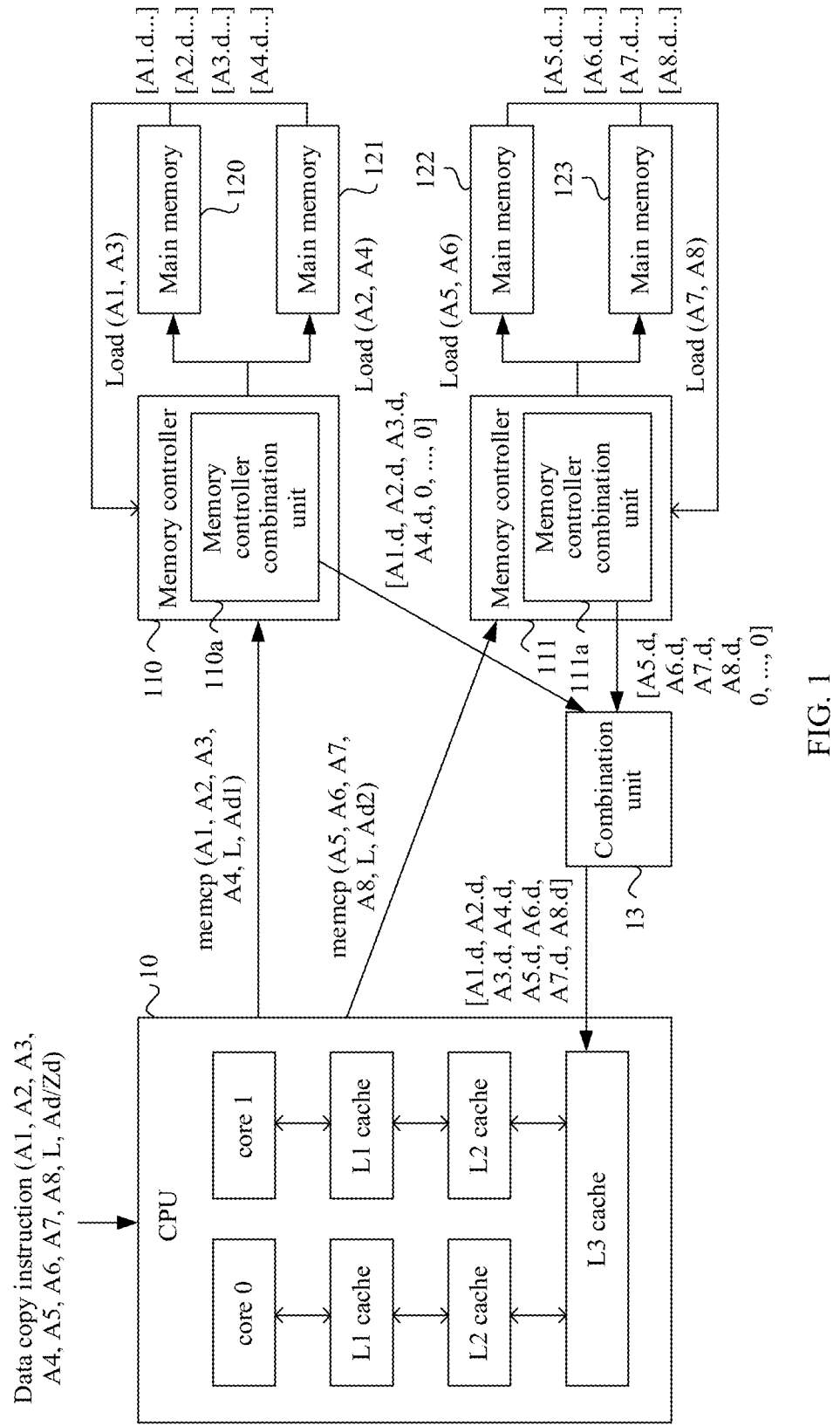
FIG. 1 is a diagram of a structure of a data access system according to an embodiment.

To make objectives, technical solutions, and advantages clearer, the following clearly describes technical solutions with reference to accompanying drawings. It is clear that the described embodiments are merely some rather than all of embodiments. All other embodiments obtained by a person of ordinary skill in the art based on embodiments without creative efforts shall fall within the protection scope of this disclosure.

In the specification, embodiments, claims, and accompanying drawings, the terms "first", "second", and the like are merely intended for distinguishing and description, and shall not be understood as indicating or implying relative importance, or indicating or implying a sequence. In addition, the terms "include", "have", and any variant thereof are intended to cover non-exclusive inclusion, for example, include a series of steps or units. A method, network, product, or device is not necessarily limited to those steps or units expressly listed, but may include other steps or units not expressly listed or inherent to such a process, method, product, or device.

It should be understood that "at least one (item)" refers to one or more and "a plurality of" refers to two or more. The term "and/or" is used for describing an association relationship between associated objects, and represents that three relationships may exist. For example, "A and/or B" may represent the following three cases: Only A exists, only B exists, and both A and B exist, where A and B may be singular or plural. The character "/" generally indicates an "or" relationship between the associated objects. The expression "at least one of the following items (pieces)" or a similar expression means any combination of these items, including a single item (piece) or any combination of a plurality of items (pieces). For example, at least one item (piece) of a, b, or c may indicate a, b, c, "a and b", "a and c", "b and c", or "a, b, and c", where a, b, and c may be singular or plural.

Embodiments provide a data access method, which may be used for sparse-address access and noncontiguous-address access, to improve utilization of a cache line and efficiency of loading data in a memory without modifying an existing cache mechanism or adding a jump wire. In addition, data loading performance in a data access scenario including non-sparse-address access and noncontiguous-address access is not affected.

The data access method may be applied to a data access system, and the data access system may include a processing subsystem and a plurality of memory controllers (MCs). The processing subsystem may include a processor and a newly added combination unit, and the processor may include a central processing unit (CPU). In addition, a combine memory controller unit is newly added to each existing memory controller. Each memory controller is configured to manage a main memory of an address area. The main memory includes but is not limited to a double data rate synchronous dynamic random-access memory (DDR SDRAM), a high bandwidth memory (HBM), and the like.

Division into the newly added combination unit and the memory controller combination unit may be merely based on logical functions, and there may be another manner in actual implementation. For example, the two units may be combined or integrated into another network, or some features may be ignored or not performed. The two units may or may not be physically separate, and parts displayed as units may or may not be physical units, in other words, may be located in one position, or may be distributed on a plurality of network units. Some or all of the units may be selected based on actual requirements to achieve the objectives of the solutions of embodiments. In addition, the two units may be integrated into one processing unit, or may exist alone physically.

The combination unit may be located in the processor, or may be located in any memory controller, or may be located outside the processor and the memory controller, for example, located between the processor and the memory controller.

FIG. 1 is a diagram of a structure of a data access system according to an embodiment. In FIG. 1, an example in which a combination unit is located between a processor and a memory controller is used for description. The data access system includes a CPU 10, a plurality of memory controllers, main memories managed by the plurality of memory controllers, and a combination unit 13.

The CPU 10 includes a plurality of CPU cores. FIG. 1 shows two CPU cores: a core 0 and a core 1. Each CPU core correspondingly has a level 1 (L10 cache and a level 2 (L2) cache, and the plurality of CPU cores share a level 3 (L3) cache.

Each memory controller includes a memory controller combination unit. FIG. 1 shows a memory controller 110 and a memory controller 111. The memory controller 110 includes a memory controller combination unit 110*a*, and the memory controller 111 includes a memory controller combination unit 111*b*. The memory controller 110 manages a main memory 120 and a main memory 121, and the memory controller 111 manages a main memory 122 and a main memory 123.

Figure 2:
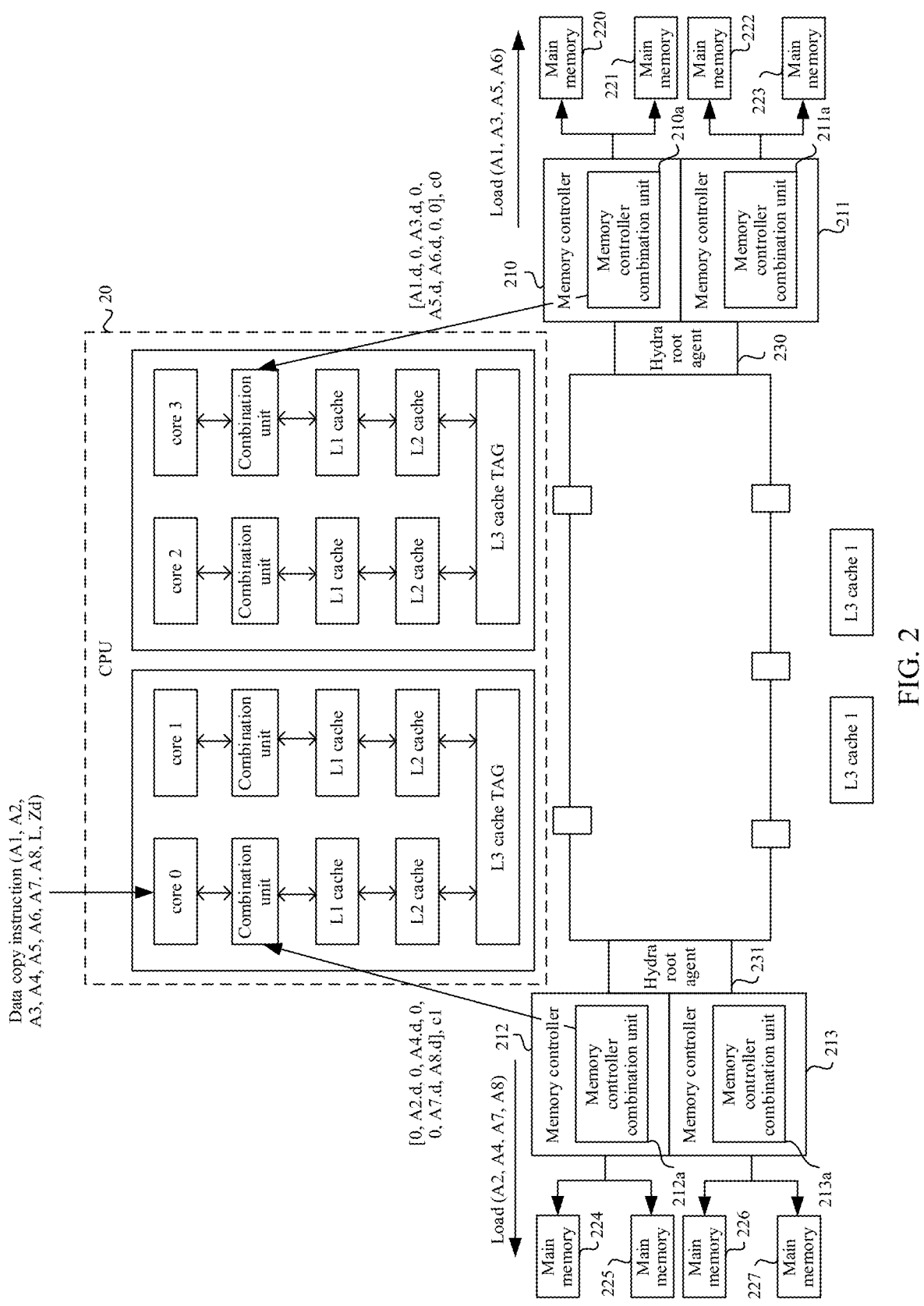
FIG. 2 is a diagram of a structure of another data access system according to an embodiment.

FIG. 2 is a diagram of a structure of another data access system according to an embodiment. In FIG. 2, an example in which a combination unit is located in a processor is used for description. The data access system includes: a CPU 20, a plurality of memory controllers, main memories managed by the plurality of memory controllers, and Hydra root agents.

The CPU 20 includes a plurality of CPU cores. FIG. 2 shows four CPU cores: a core 0 to a core 3. Each CPU core correspondingly has a combination unit, an L1 cache, and an L2 cache. The core 0 and the core 1 share an L3 cache 1, and the core 2 and the core 3 share an L3 cache 2. The L3 cache 1 includes an L3 cache TAG 1 and an L3 cache 1 storage body, and the L3 cache 2 includes an L3 cache TAG 2 and an L3 cache 2 storage body. The L3 cache TAG is used to record a location of data in the L3 cache storage body.

Each memory controller includes a memory controller combination unit. FIG. 2 shows a memory controller 210, a memory controller 211, a memory controller 212, a memory controller 213, a Hydra root agent 230, and a Hydra root agent 231. The memory controller 210 and the memory controller 211 are connected to the CPU 20 via the Hydra root agent 230, and the memory controller 212 and the memory controller 213 are connected to the CPU 20 via the Hydra root agent 231.

The memory controller 210 includes a memory controller combination unit 210*a*, the memory controller 211 includes a memory controller combination unit 211*a*, the memory controller 212 includes a memory controller combination unit 212*a*, and the memory controller 213 includes a memory controller combination unit 213*a*. The memory controller 210 manages a main memory 220 and a main memory 221, the memory controller 211 manages a main memory 222 and a main memory 223, the memory controller 212 manages a main memory 224 and a main memory 225, and the memory controller 213 manages a main memory 226 and a main memory 227.

FIG. 3 is a schematic flowchart of a data access method according to an embodiment. The method may be applied to a memory controller in a data access system, for example, any memory controller shown in FIG. 1 and FIG. 2. The method may include the following process.

301: Receive a data request, where the data request indicates a plurality of source storage addresses and a target data type.

The source storage address is an address of a main memory, and the plurality of source storage addresses may be contiguous or non-contiguous.

302: Read, from the memory based on the data request, a first memory block indicated by each of the plurality of source storage addresses, where a length of the first memory block is a granularity for accessing the memory.

The memory controller first determines whether data of each source storage address is in a cache. The memory controller may map the source storage address into a source cache address, and then determine, based on the source cache address, whether the data of the source storage address is in the cache. When the data of the source storage address is in the cache, the memory controller reads the data of the source storage address from the cache. When the data of the source storage address is not in the cache, the memory controller reads the data from the main memory.

It can be learned from the foregoing description that data is read per cache line from the main memory. In this embodiment, data may be read from the main memory at a granularity of the first memory block, and the length of the first memory block is less than a length of the cache line.

For example, a manner of implementing that the length of the first memory block is less than the length of the cache line includes but is not limited to: The main memory is a DDR5, the DDR5 is in a "burst termination (immediately effective) (burst chop 8 on the fly, BC8 OTF)" mode, a minimum burst length is 8 bytes, and 32-byte data may be returned each time, that is, the length of the first memory block is 32 bytes; and the main memory is an HBM2, the HBM2 is in a pseudo channel mode, and 32-byte data may be returned each time, that is, the length of the first memory block is 32 bytes.

The memory controller may read, based on each source storage address, data whose length is less than the length of the cache line. This can improve effective memory bandwidth without modifying a cache mechanism.

303: Extract the data of each source storage address from the first memory block indicated by each source storage address.

The memory controller discards data in the first memory block other than the data of the source storage address.

304: Combine data of all the source storage addresses based on the length of the cache line to obtain a second memory block.

A length of the second memory block is equal to the length of the cache line. The memory controller contiguously stores the data of all the source storage addresses based on the length of the cache line. When the data of all the source storage addresses does not fully fill an integer quantity of second memory blocks (that is, when a length of the data of all the source storage addresses is not an integer multiple of the length of the cache line), an idle location is padded with 0 to obtain at least one second memory block.

305: Send the second memory block to a processing subsystem, for the processing subsystem to cache the second memory block.

For example, the second memory block may be transparently transmitted to the processing subsystem.

In an existing protocol, the memory controller transmits data to a processor based on the length of the cache line. In this embodiment, the data of all the source storage addresses is combined based on the length of the cache line. Therefore, the second memory block may be sent to the processing subsystem according to an existing bus transmission protocol, and a transmission protocol from the memory controller to the processing subsystem does not need to be modified. This reduces chip manufacturing costs.

In conclusion, according to the data access method provided in this embodiment, the data request is first received. The data request indicates the plurality of source storage addresses and the target data type. Then, the first memory block indicated by each of the plurality of source storage addresses is read from the memory based on the data request. The length of the first memory block is a granularity for accessing the memory. The data of each source storage address is extracted from the first memory block indicated by each source storage address, and the data of all the source storage addresses is combined based on the length of the cache line to obtain the second memory block. Finally, the second memory block is sent to the processing subsystem, for the processing subsystem to cache the second memory block. The memory controller performs filtering and contiguous storage on data of the source storage addresses, and then returns the second memory block of the length of the cache line. In comparison with a case in which only one piece of valid data exists in one cache line length in a related technology, a plurality of pieces of valid data exist in one cache line length. Therefore, utilization of the cache line and efficiency of loading data in the memory are effectively improved. In addition, the data of all the source storage addresses is combined based on the length of the cache line. Therefore, the second memory block may be sent to the processing subsystem according to the existing bus transmission protocol via a channel, the transmission protocol from the memory controller to the processing subsystem does not need to be modified, an existing cache mechanism does not need to be modified, and a jump wire is not needed. This reduces chip manufacturing costs. In addition, determining does not need to be performed before data of sparse addresses is accessed. Therefore, data loading performance in a data access scenario including non-sparse-address access and noncontiguous-address access is not affected.

FIG. 4 is a schematic flowchart of another data access method according to an embodiment. The method may be applied to a processing subsystem in a data access system, for example, processing subsystems shown in FIG. 1 and FIG. 2. The method may include the following process.

401: Receive a data copy instruction, where the data copy instruction carries a plurality of source storage addresses, a target data type, and a destination storage address.

The plurality of source storage addresses may be contiguous or non-contiguous. For example, a length of data of the plurality of source storage addresses is an integer multiple of a length of a cache line.

The data copy instruction triggers a process of copying the data of the plurality of source storage addresses to the destination storage address. The destination storage address may indicate space in a cache, or may indicate space in a register.

Figure 5:
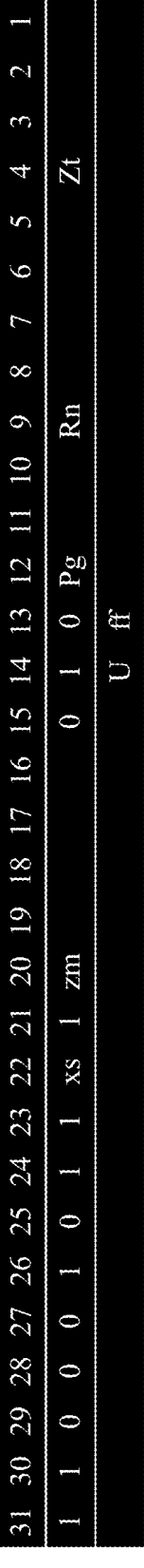
FIG. 5 is a diagram of a data copy instruction according to an embodiment.

For example, FIG. 5 is a diagram of a data copy instruction according to an embodiment. In FIG. 5, an example in which a destination storage address in the data copy instruction indicates space in a vector register is used for description. The source storage address is generated based on a scalar base and a vector index, and the target data type is double-word. The vector index may be 32 bits to 64 bits, may be signed or unsigned, and may optionally be multiplied by 8.

As shown in FIG. 5, a length of the data copy instruction is 32 bytes (from 0 to 31), and Rn, Pg, and Zt indicate numbers of registers, that is, specifically numbers of vector registers or general-purpose registers. The instruction may be: LD1GC {<Zt>.D}, <Pg>/Z, [<Xn|SP>, <Zm>.D, <mod>#3], where Zt and Zm indicate vector registers, Xn indicates a general-purpose register, and SP indicates a special register.

Figure 6:
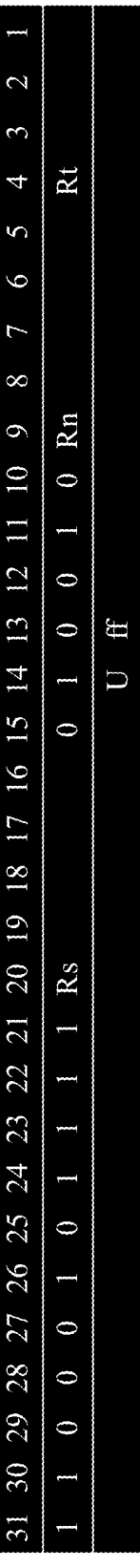
FIG. 6 is a diagram of another data copy instruction according to an embodiment.

FIG. 6 is a diagram of another data copy instruction according to an embodiment. In FIG. 6, an example in which a destination storage address in the data copy instruction indicates space corresponding to a storage address of a scalar register is used for description. As shown in FIG. 6, a length of the data copy instruction is 32 bytes (from 0 to 31), and Rn and Rt indicate numbers of registers, that is, specifically numbers of vector registers or general-purpose registers. The instruction may be: LD64G C [<Xt>], <Xs>, [<Xn>{,#0}], where Xt indicates a destination register, Xs indicates a status register, and Xn indicates a source storage address. The instruction instructs to read, from memory addresses stored in contiguous registers Xn to X(n+7), data of a length indicated by the target data type, then copy the data to space corresponding to a 64-bit scalar address stored in the destination register Xt, and write a status result of storage into the status register Xs.

402: Send a data request to each target memory controller according to the data copy instruction, where the target memory controller is one of a plurality of memory controllers that corresponds to the source storage address, the data request indicates the plurality of source storage addresses corresponding to the target memory controller and the target data type, and the data request is used by the target memory controller to determine a memory block.

The processing subsystem determines a memory controller that manages the source storage addresses as the target memory controller.

403: Receive a memory block sent by at least one target memory controller, where the memory block sent by the target memory controller includes data of a plurality of source storage addresses corresponding to the target memory controller, and a length of the memory block is equal to the length of the cache line.

404: Cache each received memory block based on the destination storage address.

For example, when receiving memory blocks respectively sent by the plurality of target memory controllers, the processing subsystem aggregates data in the received memory blocks into at least one target cache line, and then caches the at least one target cache line based on the destination storage address.

An example in which the destination storage address indicates space in a vector register is used. The processing subsystem may cache the at least one target cache line in a valid bit of the vector register, and a non-valid bit may be set to 0.

In conclusion, according to the data access method provided in this embodiment, the data copy instruction is first received. The data copy instruction carries the plurality of source storage addresses, the target data type, and the destination storage address. Then, the data request is sent to each target memory controller according to the data copy instruction. The target memory controller is one of the plurality of memory controllers that corresponds to the source storage address. The data request indicates the plurality of source storage addresses corresponding to the target memory controller and the target data type, and the data request is used by the target memory controller to determine the memory block. When receiving the memory block sent by the at least one target memory controller, each received memory block is cached based on the destination storage address. The memory block sent by the target memory controller includes the data of the plurality of source storage addresses corresponding to the target memory controller. When receiving the memory blocks respectively sent by the plurality of target memory controllers, the data in the received memory blocks is aggregated into the at least one target cache line. In comparison with a case in which only one piece of valid data exists in one cache line length in a related technology, a plurality of pieces of valid data exist in one cache line length. Therefore, utilization of the cache line and efficiency of loading data in a memory are effectively improved. In addition, the length of the memory block is equal to the length of the cache line. Therefore, the memory block may be received according to an existing bus transmission protocol via a channel, a transmission protocol from the memory controller to the processing subsystem does not need to be modified, an existing cache mechanism does not need to be modified, and a jump wire is not needed. This reduces chip manufacturing costs. In addition, determining does not need to be performed before data of sparse addresses is accessed. Therefore, data loading performance in a data access scenario including non-sparse-address access and noncontiguous-address access is not affected.

A sequence of the method provided in embodiments may be properly adjusted, and a process may alternatively be correspondingly added or deleted as required. Any method variation readily figured out by a person skilled in the art within the technical scope disclosed shall fall within the protection scope of this disclosure.

The following describes a function of each module in a data access system based on the foregoing data access method. A processing subsystem is configured to receive a data copy instruction. The processing subsystem is further configured to send a data request to each target memory controller according to the data copy instruction. The target memory controller is configured to read, from a memory based on the data request, a first memory block indicated by each corresponding source storage address. A length of the first memory block is a granularity for accessing the memory. The target memory controller is further configured to extract, from each read first memory block, data of each corresponding source storage address, and combine data of all corresponding source storage addresses based on a length of a cache line to obtain a second memory block. The target memory controller is further configured to send the second memory block to the processing subsystem. The processing subsystem is further configured to store each received second memory block based on a destination storage address.

A process of obtaining the second memory block based on the read first memory block may be executed by a memory controller combination unit in the target memory controller. As described above, the processing subsystem includes a processor and a combination unit. When the combination unit is located outside the processor and the memory controller, a processor core is configured to receive the data copy instruction and identify the data copy instruction. Then, the data request is sent to each target memory controller according to the data copy instruction. The target memory controller is configured to send the second memory block to the combination unit, and the combination unit is configured to store each received second memory block based on the destination storage address.

For example, FIG. 1 is used as an example. The CPU 10 receives a data copy instruction. The data copy instruction carries a plurality of source storage addresses: A1 to A8. A target data type is L, a destination storage address is Ad/Zd, where Ad indicates an address in a cache, and Zd indicates an address in a register. The CPU 10 determines, based on source storage addresses A1 to An, that target memory controllers are the memory controller 110 and the memory controller 111, and the CPU 10 separately sends a data request memcp to the memory controller 110 and the memory controller 111. The memcp sent to the memory controller 110 indicates L, Ad1, and a plurality of source storage addresses: A1, A2, A3, and A4, where Ad1 indicates a target address, indicates a location to which the memcp sent to the memory controller 110 needs to be loaded, and is determined by the memcp. The memcp sent to the memory controller 111 indicates L, Ad2, and a plurality of source storage addresses: A5, A6, A7, and A8, where Ad2 indicates a target address, indicates a location to which the memcp sent to the memory controller 111 needs to be loaded, and is determined by the memcp. The memory controller 110 sends a load instruction Load (A1, A3) to a main memory 120, and sends a load instruction Load (A2, A4) to a main memory 121. The memory controller 111 sends a load instruction Load (A5, A6) to a main memory 122, and sends a load instruction Load (A7, A8) to a main memory 123.

Then, the memory controller 110 receives a plurality of first memory blocks [A1.d . . . ], [A2.d . . . ], [A3.d . . . ], and [A4.d . . . ] returned by the memory. The memory controller 111 receives a plurality of first memory blocks [A5.d . . . ], [A6.d . . . ], [A7.d . . . ], and [A8.d . . . ] returned by the memory, where Ai.d indicates data of an Ai address, Ai.d . . . indicates a first memory block indicated by Ai, $1 \leq i \leq 8$, and i is an integer.

The memory controller combination unit 110a extracts A1.d, A2.d, A3.d and A4.d from [A1.d . . . ], [A2.d . . . ], [A3.d . . . ], and [A4.d . . . ]. It is assumed that a total length of A1.d, A2.d, A3.d, and A4.d is half of the length of the cache line, an idle location is padded with 0, so that a total length of A1.d, A2.d, A3.d, A4.d, and the padded 0 is equal to the length of the cache line, to obtain a second memory block: [A1.d, A2.d, A3.d, A4.d, 0, 0, 0, 0].

The memory controller combination unit 111b extracts A5.d, A6.d, A7.d and A8.d from [A5.d . . . ], [A6.d . . . ], [A7.d . . . ], and [A8.d . . . ]. It is assumed that a total length of A5.d, A6.d, A7.d, and A8.d is half of the length of the cache line, an idle location is padded with 0, so that a total length of A5.d, A6.d, A7.d, A8.d, and the padded 0 is equal to the length of the cache line, to obtain a second memory block: [A5.d, A6.d, A7.d, A8.d, 0, 0, 0, 0].

The memory controller 110 sends [A1.d, A2.d, A3.d, A4.d, 0, 0, 0, 0] to a combination unit 13. The memory controller 111 sends [A5.d, A6.d, A7.d, A8.d, 0, 0, 0, 0] to the combination unit 13. The combination unit 13 aggregates non-zero data in the two second memory blocks into one cache line: [A1.d, A2.d, A3.d, A4.d, A5.d, A6.d, A7.d, A8.d]. The combination unit 13 caches [A1.d, A2.d, A3.d, A4.d, A5.d, A6.d, A7.d, A8.d] in an L3 cache based on Ad/Zd.

When the combination unit is located in the processor, the processor core is configured to: receive the data copy instruction, identify the data copy instruction, convert the data copy instruction into an instruction (a loading request) of the processor, and send the loading request to the corresponding combination unit. The combination unit that receives the loading request is configured to send the data request to each target memory controller based on the loading request. The target memory controller is configured to send the second memory block to the combination unit, and the combination unit is configured to store each received second memory block based on the destination storage address.

For example, FIG. 2 is used as an example. The core 0 receives a data copy instruction. The data copy instruction carries a plurality of source storage addresses: A1 to A8, a target data type is L, and a destination storage address is Zd. The core 0 converts the data copy instruction into a loading request, and sends the loading request to a corresponding combination unit. The combination unit determines, based on the source storage addresses A1 to A8 indicated by the loading request, that target memory controllers are the memory controller 210 and the memory controller 212. The combination unit separately sends the data request memcp to the memory controller 210 and the memory controller 212. A type of the memcp is a device request, and the memcp is converted to a normal request at the Hydra root agent 230 and the Hydra root agent 231.

The memcp sent to the memory controller 210 indicates a plurality of source storage addresses A1, A3, A5, A6, and L. The memcp sent to the memory controller 212 indicates a plurality of source storage addresses A2, A4, A7, A8, and L. The memory controller 210 sends a load instruction Load (A1, A3, A5, A6) to a main memory 220 and a main memory 221, and the memory controller 212 sends a load instruction Load (A2, A4, A7, A8) to a main memory 224 and a main memory 225.

Then, the memory controller 210 receives a plurality of first memory blocks [A1.d . . . ], [A3.d . . . ], [A5.d . . . ], and [A6.d . . . ] returned by the memory. The memory controller 212 receives a plurality of first memory blocks [A2.d . . . ], [A4.d . . . ], [A7.d . . . ], and [A8.d . . . ] returned by the memory, where Ai.d indicates data of an Ai address, Ai.d . . . indicates a first memory block indicated by Ai, $1 \le i \le 8$, and i is an integer.

The memory controller combination unit 210a extracts A1.d, A3.d, A5.d, and A6.d from [A1.d . . . ], [A3.d . . . ], [A5.d . . . ], and [A6.d . . . ]. It is assumed that a total length of A1.d, A3.d, A5.d, and A6.d is half of the length of the cache line, an idle location is padded with 0, so that a total length of A1.d, A3.d, A5.d, A6.d, and the padded 0 is equal to the length of the cache line, to obtain a second memory block: [A1.d, 0, A3.d, 0, A5.d, A6.d, 0, 0].

The memory controller combination unit 212a extracts A2.d, A4.d, A7.d and A8.d from [A2.d . . . ], [A4.d . . . ], [A7.d . . . ], and [A8.d . . . ]. It is assumed that a total length of A2.d, A4.d, A7.d, and A8.d is half of the length of the cache line, an idle location is padded with 0, so that a total length of A2.d, A4.d, A7.d, A8.d, and the padded 0 is equal to the length of the cache line, to obtain a second memory block [0, A2.d, 0, A4.d, 0, 0, A7.d, A8.d].

The memory controller 210 sends [A1.d, 0, A3.d, 0, A5.d, A6.d, 0, 0] and c0 to a combination unit corresponding to the core 0, where c0 is a temporary address and is allocated by the memory controller combination unit 210a or the combination unit corresponding to the core 0. The memory controller 212 sends [0, A2.d, 0, A4.d, 0, 0, A7.d, A8.d] and c1 to the combination unit corresponding to the core 0, where c1 is a temporary address and is allocated by the memory controller combination unit 212a or the combination unit corresponding to the core 0. The combination unit corresponding to the core 0 aggregates non-zero data in the two second memory blocks into one cache line: [A1.d, A2.d, A3.d, A4.d, A5.d, A6.d, A7.d, A8.d]. The combination unit corresponding to core 0 caches [A1.d, A2.d, A3.d, A4.d, A5.d, A6.d, A7.d, A8.d] in the L3 cache based on Zd.

In the foregoing process, the processor core or the combination unit directly sends the data request to the memory controller through a bus, to bypass an L1 cache and an L2 cache. This ensures cache consistency.

When the combination unit is located in the memory controller, for a corresponding process, refer to the foregoing process.

The foregoing mainly describes, from the perspective of a device, the data access method provided in embodiments. It may be understood that, to implement the foregoing functions, the device includes corresponding hardware structures and/or software modules for executing the functions. A person of ordinary skill in the art should easily be aware that, in combination with algorithms and steps in the examples described in embodiments disclosed in this specification, this disclosure can be implemented by hardware or a combination of hardware and computer software. Whether a function is executed in a manner of hardware or computer software driving hardware depends on a specific application and a design constraint condition of the technical solution. A person skilled in the art may use different methods to implement the described functions for each particular application.

In embodiments, the device may be divided into functional modules based on the foregoing method examples. For example, each functional module may be obtained through division based on each corresponding function, or two or more functions may be integrated into one processing subsystem. The integrated module may be implemented in a form of hardware, or may be implemented in a form of a software functional module. It should be noted that module division in embodiments is an example, and is merely logical function division. In actual implementation, there may be another division manner.

Figure 7:
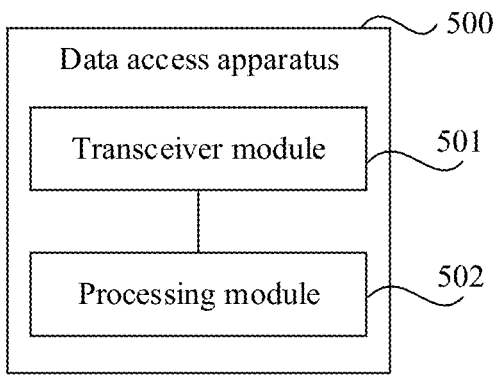
FIG. 7 is a block diagram of a data access apparatus according to an embodiment.

FIG. 7 is a block diagram of a data access apparatus according to an embodiment. When each functional module is obtained through division based on each corresponding function, the data access apparatus 500 may include a transceiver module 501 and a processing module 502. For example, the data access apparatus may be a processing subsystem or a memory controller, or may be a chip in the processing subsystem or the memory controller, or another combination device or component that has a function of the data access apparatus. When the data access apparatus 500 is a processing subsystem or a memory controller, the transceiver module 501 may be a transceiver, and the transceiver may include an antenna, a radio frequency circuit, and the like. The processing module 502 may be a processor (or a processing circuit), for example, a baseband processor. The baseband processor may include one or more CPUs. When the data access apparatus 500 is a device or component that has the foregoing function, the transceiver module 501 may be a radio frequency unit, and the processing module 502 may be a processor (or a processing circuit), for example, a baseband processor. When the data access apparatus 500 is a chip system, the transceiver module 501 may be an input/output interface of a chip (for example, a baseband chip), and the processing module 502 may be a processor (or a processing circuit) of the chip system, and may include one or more central processing units. It should be understood that the transceiver module 501 in this embodiment may be implemented by a transceiver or a transceiver-related circuit component; and the processing module 502 may be implemented by a processor or a processor-related circuit component (or referred to as a processing circuit).

The transceiver module 501 may be configured to perform all sending and receiving operations in embodiments shown in FIG. 3 and FIG. 4, and/or configured to support another process of the technology described in this specification. The processing module 502 may be configured to perform all operations other than the receiving and sending operations in the embodiments shown in FIG. 3 and FIG. 4, and/or configured to support another process of the technology described in this specification. The transceiver module 501 may include a sending module and/or a receiving module, respectively configured to perform sending and receiving operations in the embodiments shown in FIG. 3 and FIG. 4.

When the data access apparatus is a memory controller, or a chip in the memory controller, or another combination device, component, or the like that has a function of the data access apparatus, the data access apparatus includes: a transceiver module configured to receive a data request, where the data request indicates a plurality of source storage addresses and a target data type; and a processing module configured to read, from a memory based on the data request, a first memory block indicated by each of the plurality of source storage addresses, where a length of the first memory block is a granularity for accessing the memory.

The processing module is further configured to extract data of each source storage address from the first memory block indicated by each source storage address.

The processing module is further configured to combine data of all the source storage addresses based on a length of a cache line to obtain a second memory block.

The transceiver module is further configured to send the second memory block to the processing subsystem, for the processing subsystem to cache the second memory block.

With reference to the foregoing solution, the length of the first memory block is less than the length of the cache line.

With reference to the foregoing solution, the plurality of source storage addresses are noncontiguous.

When the data access apparatus is a processing subsystem, or a chip in the processing subsystem, or another combination device, component, or the like that has a function of the data access apparatus, the data access apparatus includes: a transceiver module configured to receive a data copy instruction, where the data copy instruction carries a plurality of source storage addresses, a target data type, and a destination storage address, where the transceiver module is further configured to send a data request to each target memory controller according to the data copy instruction, the target memory controller is one of a plurality of memory controllers that corresponds to the source storage address, the data request indicates the plurality of source storage addresses corresponding to the target memory controller and the target data type, and the data request is used by the target memory controller to determine a memory block; and the transceiver module is further configured to receive a memory block sent by at least one target memory controller; and a processing module configured to cache each received memory block based on the destination storage address.

With reference to the foregoing solution, the processing module is further configured to: when receiving memory blocks respectively sent by the plurality of target memory controllers, aggregate data in the received memory blocks into at least one target cache line; and cache the at least one target cache line based on the destination storage address.

Figure 8:
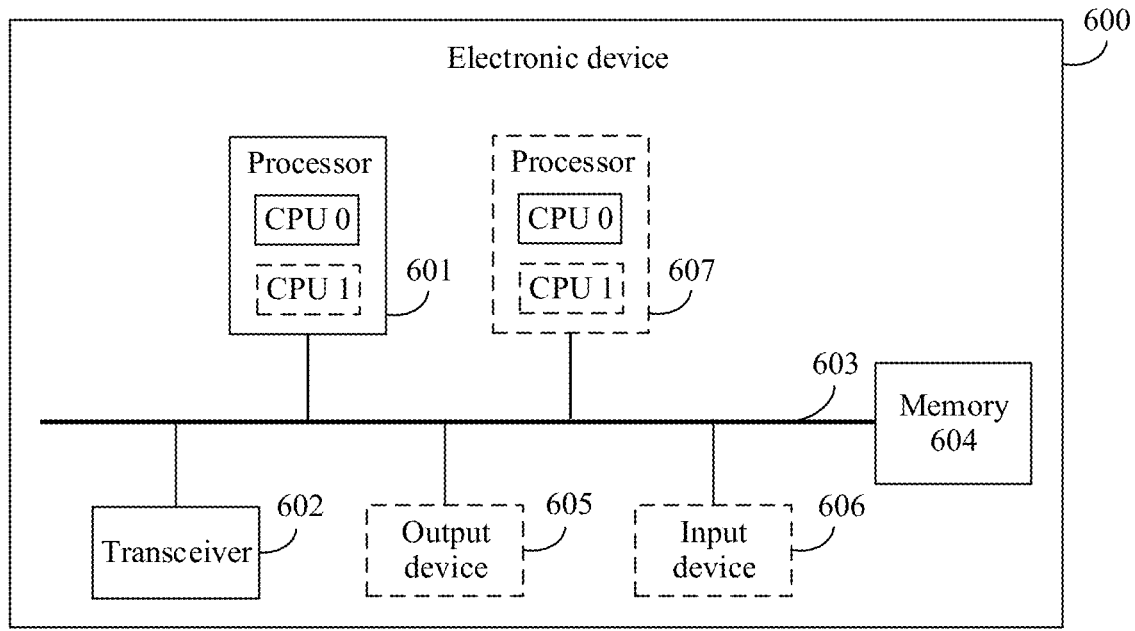
FIG. 8 is a diagram of a structure of an electronic device according to an embodiment.

FIG. 8 is a diagram of a structure of an electronic device according to an embodiment. The electronic device 600 may be a memory controller or a chip or a functional module in the memory controller, or may be a processing subsystem or a chip or a functional module in the processing subsystem. As shown in FIG. 8, the electronic device 600 includes a processor 601, a transceiver 602, and a communication line 603.

The processor 601 is configured to perform any step in the method embodiments shown in FIG. 3 and FIG. 4, and when performing a process like receiving a data request, the transceiver 602 and the communication line 603 may be invoked to complete a corresponding operation.

Further, the electronic device 600 may further include a memory 604. The processor 601, the memory 604, and the transceiver 602 may be connected through the communication line 603.

The transceiver 602 is configured to communicate with another device or another communication network. The another communication network may be the Ethernet, a radio access network (RAN), a wireless local area network (WLAN), or the like. The transceiver 602 may be a module, a circuit, a transceiver, or any apparatus that can implement communication.

The transceiver 602 is mainly configured to send and receive a request and the like, and may include a transmitter and a receiver, to separately send and receive the request and the like. An operation other than sending and receiving the request, for example, reading, from a memory based on the data request, a first memory block indicated by each of a plurality of source storage addresses is implemented by the processor.

The communication line 603 is configured to transmit information between components included in the electronic device 600.

In a design, the processor may be considered as a logic circuit, and the transceiver may be considered as an interface circuit.

The memory 604 is configured to store instructions. The instructions may be a computer program.

It should be noted that, the memory 604 may exist independently of the processor 601, or may be integrated with the processor 601. The memory 604 may be configured to store instructions, program code, some data, or the like. The memory 604 may be located in the electronic device 600, or may be located outside the electronic device 600. This is not limited. The processor 601 is configured to execute the instructions stored in the memory 604, to implement the method provided in the following embodiments.

In an example, the processor 601 may include one or more processors, such as a processor 0 and a processor 1 in FIG. 8.

In an optional implementation, the electronic device 600 includes a plurality of processors. For example, in addition to the processor 601 in FIG. 8, the electronic device 600 may further include a processor 607.

In an optional implementation, the electronic device 600 further includes an output device 605 and an input device 606. For example, the input device 606 is a device like a keyboard, a mouse, a microphone, or a joystick, and the output device 605 is a device like a display or a speaker.

It should be noted that the electronic device 600 may be a chip system or a device having a structure similar to that in FIG. 8. The chip system may include a chip, or may include a chip and another discrete device. Actions, terms, and the like in embodiments may be mutually referenced. In embodiments, names of messages exchanged between devices, names of parameters in the messages, or the like are merely examples. Other names may alternatively be used during specific implementation. This is not limited. In addition, a composition structure shown in FIG. 8 does not constitute a limitation on the electronic device 600. In addition to the components shown in FIG. 8, the electronic device 600 may include more or fewer components than those shown in FIG. 8, or combine some components, or have different component arrangements.

The processor and the transceiver may be implemented on an integrated circuit (IC), an analog IC, a radio frequency integrated circuit, a mixed-signal IC, an application-specific integrated circuit (ASIC), a printed circuit board (PCB), an electronic device, or the like. The processor and the transceiver may alternatively be manufactured by using various IC process technologies, for example, a complementary metal-oxide-semiconductor (CMOS), an N-type metal-oxide-semiconductor (NMOS), a P-type metal-oxide-semiconductor (PMOS), a bipolar junction transistor (BJT), a bipolar CMOS (BiCMOS), silicon germanium (SiGe), and gallium arsenide (GaAs).

Figure 9:
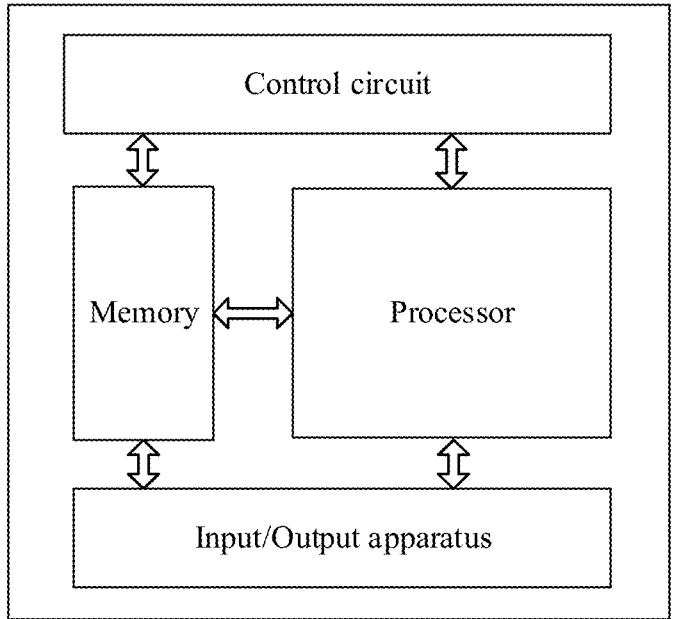
FIG. 9 is a diagram of a structure of a data access apparatus according to an embodiment.

FIG. 9 is a diagram of a structure of a data access apparatus according to an embodiment. The data access apparatus may be applicable to scenarios shown in the foregoing method embodiments. For ease of description, FIG. 9 shows only main components of the data access apparatus, including a processor, a memory, a control circuit, and an input/output apparatus. The processor is mainly configured to process a communication protocol and communication data, execute a software program, and process data of the software program. The memory is mainly configured to store the software program and data. The control circuit is mainly used for power supply and transmission of various electrical signals. The input/output apparatus is mainly configured to receive data input by a user and output data to the user.

When the data access apparatus is a memory controller or a processing subsystem, the control circuit may be a main board, and the memory includes a medium having a storage function, for example, a hard disk, a RAM, or a ROM. The processor may include a baseband processor and a central processing unit. The baseband processor is mainly configured to process a communication protocol and communication data, and the central processing unit is mainly configured to control the entire data access apparatus, execute a software program, and process data of the software program. The input/output apparatus includes a display, a keyboard, a mouse, and the like. The control circuit may further include or be connected to a transceiver circuit or a transceiver, for example, a network cable interface, and is configured to send or receive data or a signal, for example, perform data transmission and communication with another device. Further, an antenna may be further included and may be configured to receive and send a request and to perform data/request transmission with another device.

According to the method provided in embodiments, a computer program product includes computer program code. When the computer program code is run on a computer, the computer is enabled to perform the method according to any one of embodiments.

Embodiments further provide a computer-readable storage medium. All or some of procedures in the foregoing method embodiments may be implemented by a computer or an apparatus having a data access capability by executing a computer program or instructions, to control related hardware. The computer program or the group of instructions may be stored in the computer-readable storage medium. When the computer program or the group of instructions are executed, the procedures of the foregoing method embodiments may be included. The computer-readable storage medium may be an internal storage unit of the memory controller or the processing subsystem according to any one of the foregoing embodiments, for example, a hard disk or a memory of the memory controller or the processing subsystem. The computer-readable storage medium may alternatively be an external storage device of the memory controller or the processing subsystem, for example, a plug-in hard disk, a smart media card (SMC), a secure digital (SD) card, or a flash card configured on the memory controller or the processing subsystem. Further, the computer-readable storage medium may include both the internal storage unit of the memory controller or the processing subsystem and the external storage device. The computer-readable storage medium is configured to store the computer program or the instructions and another program and data that may be required by the memory controller or the processing subsystem. The computer-readable storage medium may be further configured to temporarily store data that has been output or is to be output.

A person of ordinary skill in the field may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application.

It may be clearly understood by a person skilled in the art that, for the purpose of convenient and brief description, for a detailed working process of the foregoing apparatus, reference may be made to a corresponding process in the foregoing method embodiments, and details are not described herein again.

In the several embodiments provided, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve objectives of solutions of embodiments.

In addition, function units in embodiments may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions may be implemented in a form of a software product. The computer software product is stored in a storage medium and includes several instructions for instructing a computer device (a personal computer, a server, a network device, or the like) to perform all or a part of the steps of the methods in embodiments. The foregoing storage medium includes any medium that can store program code, such as a USB flash drive, a removable hard disk, a ROM, a RAM, a magnetic disk, or an optical disc.

The foregoing descriptions are merely specific implementations, but are not intended to limit the protection scope of this disclosure. Any variation or replacement readily figured out by a person skilled in the art within the technical scope disclosed shall fall within the protection scope of this disclosure. Therefore, the protection scope of this disclosure shall be subject to the protection scope of the claims. The foregoing mainly describes, from a perspective of a device, the data access method provided in embodiments. It may be understood that, to implement the foregoing functions, the device includes corresponding hardware structures and/or software modules for executing the functions. A person of ordinary skill in the art should easily be aware that, in combination with algorithms and steps in the examples described in embodiments disclosed in this specification, this disclosure can be implemented by hardware or a combination of hardware and computer software. Whether a function is performed by hardware or hardware driven by computer software depends on particular applications and design constraints of the technical solutions. A person skilled in the art may use different methods to implement the described functions for each particular application.

What is claimed is:

1. A method comprising:
receiving a data request comprising source storage addresses and a target data type;
reading, from a memory, first memory blocks indicated by the source storage addresses and the target data type, wherein a first length of the first memory blocks is a granularity for accessing the memory;
extracting data that are from the first memory blocks and that are indicated by the source storage addresses;
determining a second length of a cache line in the memory;
combining the data based on the second length to obtain a second memory block of the second length; and
sending the second memory block to a processing subsystem for the processing subsystem to cache the second memory block.

2. The method of claim 1, wherein the first length is shorter than the second length.

3. The method of claim 1, wherein the source storage addresses are non-contiguous.

4. The method of claim 1, wherein the source storage addresses are contiguous.

5. The method of claim 1, further comprising padding the second memory block with 0s so that the second memory block is of the second length.

6. A method comprising:
receiving a data copy instruction comprising first source storage addresses, a target data type, and a destination storage address, wherein the first source storage addresses correspond to memory controllers and comprise second source storage addresses corresponding to a first target memory controller of the memory controllers;
sending, to the first target memory controller, a data request comprising the second source storage addresses and the target data type;
receiving, from the first target memory controller, a first memory block comprising first data indicated by the second source storage addresses and the target data type, wherein the first memory block is based on a second length of a first cache line in a first memory of the first target memory controller, and wherein a first length of the first memory block is equal to the second length; and
caching the first memory block based on the destination storage address.

7. The method of claim 6, further comprising:
sending, to a second target memory controller of the memory controllers and corresponding to the second source storage addresses, the data request; and
receiving, from the second target memory controller, a second memory block comprising second data indicated by the second source storage addresses and the target data type, wherein a third length of the second memory block is equal to a fourth length of a second cache line in a second memory of the second target memory controller.

8. The method of claim 7, further comprising aggregating the first data and the second data into at least one target cache line.

9. The method of claim 8, wherein caching the first memory block comprises caching the at least one target cache line based on the destination storage address.

10. The method of claim 6, wherein the first length is shorter than the second length.

11. The method of claim 6, wherein the first length is an integer multiple of the second length.

12. The method of claim 6, wherein the second source storage addresses are non-contiguous.

13. The method of claim 6, wherein the second source storage addresses are contiguous.

14. A system comprising:
a processing subsystem configured to:
receive a data copy instruction comprising first source storage addresses, a target data type, and a destination storage address, wherein the first source storage addresses comprise second source storage addresses;
send a data request comprising the second source storage addresses and the target data type;
receive a second memory block comprising first data indicated by the second source storage addresses and the target data type; and
cache the second memory block based on the destination storage address; and
memory controllers corresponding to the first source storage addresses and comprising a first target memory controller, wherein the first target memory controller comprises a first memory, corresponds to the second source storage addresses, and is configured to:
receive the data request from the processing subsystem;
read, from the first memory, first memory blocks indicated by the second source storage addresses and the target data type, wherein a first length of the first memory blocks is a first granularity for accessing the first memory;
extract the first data from the first memory blocks;
determine a second length of a first cache line in the first memory;
combine the first data based on the second length to obtain the second memory block, wherein a third length of the second memory block is equal to the second length; and
send the second memory block to the processing subsystem.

15. The system of claim 14, wherein the memory controllers comprise a second target memory controller comprising a second memory and corresponding to the second source storage addresses, wherein the processing subsystem is further configured to:
send, to the second target memory controller, the data request; and
receive, from the second target memory controller, a fourth memory block comprising second data indicated by the second source storage addresses and the target data type, wherein a fourth length of the fourth memory block is equal to a fifth length of a second cache line in the second memory.

16. The system of claim 15, wherein the second target memory controller is configured to:

receive the data request from the processing subsystem;

read, from the second memory, third memory blocks indicated by the second source storage addresses and the target data type, wherein a sixth length of the third memory blocks is a second granularity for accessing the second memory;

extract the second data from the third memory blocks;

combine the second data based on a seventh length of the second cache line to obtain the fourth memory block, wherein the fourth length is equal to the seventh length; and send the fourth memory block to the processing subsystem.

17. The system of claim 16, wherein the processing subsystem is further configured to aggregate the first data and the second data into at least one target cache line.

18. The system of claim 17, wherein the processing subsystem is further configured to cache the second memory block by caching the at least one target cache line based on the destination storage address.

19. The system of claim 14, wherein the first length is shorter than the second length.

20. The system of claim 14, wherein the second source storage addresses are non-contiguous.

21. The system of claim 14, wherein the second source storage addresses are contiguous.

*   *   *   *   *